United States Patent Office 3,117,869
Patented Jan. 14, 1964

3,117,869
METHOD OF PRODUCING DRY SAUSAGE
Thad F. Sims, South St. Paul, Minn., assignor to Armour and Company, Chicago, Ill., a corporation of Delaware
No Drawing. Filed Sept. 12, 1962, Ser. No. 223,262
7 Claims. (Cl. 99—109)

This invention relates to the production of dry sausage products, and more particularly to the production of dry, Italian-type sausage products using artificial casings. The present application is a continuation-in-part of application Serial No. 770,280, filed October 29, 1958, and now abandoned.

Dry sausage is processed by drying and is customarily served cold, without further cooking or processing. The principal dry sausage products, broadly speaking are the salami and cervelats. Salami generally are coarsely chopped and cervelats generally are finely chopped, although there are exceptions to this rule. Sometimes the same raw material is stuffed into different kinds of casings and bear different names. There is a wide variety of dry sausage, with many of the sausages deriving their names from their "birthplace" or location where the style of sausage was first produced. In other instances, names originated because of certain material in the sausage.

Dry sausage products are generally divided into two classes, smoked dry sausage and unsmoked dry sausage. Most varieties of dry sausage are subjected to a smoking operation which imparts to the sausage an appetizing flavor, almost completely destroys all surface bacteria, and in addition helps to develop the permanent red color which the trade demands. The Italian-type dry sausage products, on the other hand, are not subjected to any heat treating or smoking operation, the usual practice being to stuff the meat into natural casings and thereafter air dry the encased product for an extended period of time, which may be form one to six months.

Dry sausage products have always been one of the highest priced food products because of the expensive manufacturing processes involved and because of the substantial loss in weight upon drying for long periods of time. Some sausage products shrink as much as 40% in the drying rooms. Frequently there is also great difficulty in the preparation and marketing of this type of sausage due to molds, discoloration and deterioration of the products resulting in a substantial amount of spoilage. This is particularly true in the case of dry, Italian-type sausages wherein the meat is stuffed into natural casings and is then air dried for an extended period of time.

It has been generally acknowledged, that in the preparation of dry sausage products, the use of natural casings such as sewed hog bungs or beef middles is indispensable because the casings must "dry" with the meat. Natural casings will adhere closely to the product as it shrinks in the drying rooms, and it is generally believed that when artificial casings are substituted for natural casings in the manufacture of dry sausage, the resulting product is very likely to be unsatisfactory.

Heretofore, natural casings such as sewed hog bungs or beef middles were used in the preparation of dry, Italian-type sausage products. To insure good results using these natural casings, the casings should be cured approximately thirty days before they are to be used. The casings are soaked in water to remove salt and to make them pliable. Then they are placed on various sized wood sticks for drying in air-conditioned chambers. The finished dried casings are then cut and peeled off the casing sticks for matching and trimming. Thereafter the casings are sewed, graded and salted. It should be noted that all of these operations make the use of natural casings rather expensive and time consuming.

Applicant has discovered a method of producing dry, Italian-type sausage products which to a large extent overcomes the disadvantages encountered in using conventional methods and which can be advantageously adapted to either large or small scale sausage manufacturing operations. In its most general aspect the invention involves introducing the meat emulsion into artificial casings, and thereafter subjecting the encased sausage product to a heat treating operation, resulting in a sausage product of comparable taste and quality to that produced using natural casings, without the inherent disadvantages involved in using natural casings.

It is therefore an important object of this invention to provide a method of making a dry sausage in which the drying time is materially reduced.

Another object of this invention is to provide a sausage treatment which greatly avoids the molds and discoloration and thus eliminates much of the spoilage which has heretofore been common.

Yet another object of this invention is to reduce the high expense involved in the use of natural casings in the production of dry, Italian-type sausage products.

A still further object of this invention is to provide a method of making a dry sausage in which weight loss due to drying is materially reduced.

Other objects and advantages will become apparent as the specification proceeds.

In the preferred practice of my invention, the meat emulsion used in the preparation of dry sausage products is made up in accordance with well-known formulas.

The chopped meat is customarily delivered to a curing cooler maintained at a temperature of from 36°–38° F. In this chill room the meat is spread in sausage curing trucks in layers about twelve inches thick. The meat is kneaded to expel as much air as possible and the surface is covered with parchment paper to prevent oxidation of the meat by the air. Depending upon the size of the meat particles, the meat is allowed to remain in the curing room for from one to four days. This operation results in a partial curing of the meat emulsion.

Thereafter the emulsion is stuffed into artificial casings, the size and tying of the casings being determined to a large extent by the kind of dry sausage being produced. The preferred artificial casings are available under the trademark of "Brechteen." Such casings are made from animal fibers derived mainly from animal hides with cross-tensilization of the fibers to enhance the strength of the casing. Other chemicals are added to make the product a soft, pliable material that can be extruded to desired sizes.

After the meat has been stuffed into the casings, the open end is securely tied and a loop hanger is formed with the twine so that the sausage may be hung on sticks for drying.

I prefer to further cure the sausage in a sausage hanging curing cooler for from three to five days. The sausage may then be spread out on cages and the cages placed in a temper room to allow some of the moisture to escape before the sausage is placed in the final drying room. Temperatures in this room may vary from 68°–85° F. and humidities from 80 to 90% depending on the kind of product desired. The length of time spent in this temper room again depends on the kind of product desired, although normally the sausage is retained for from one to three days. Excellent results have been obtained by tempering the sausage product for about two days at about 70° F. and 85% relative humidity.

The cages containing the tempered sausage are then placed in a heated room or smokehouse for heat treatment at a temperature of from 80°–170° F. for a period of from about one to forty hours. Better results can be obtained at a temperature of from about 80° F. to about 140° F. for a period of time of from four to forty hours. The length of time of this heat treatment is ordinarily dependent upon temperature; that is at the higher temperatures, a shorter period of time is required. For example, excellent results have been obtained at a temperature of from 120°–130° F. for a period of time of from about twenty-eight to thirty hours. At higher temperatures, i.e., 140°–170° F., a shorter period of time is required; the time period usually being from about one to ten hours. The heat treatment is a very important and necessary step in the processing cycle, and although it is ordinarily accomplished in the absence of smoke, a small amount of smoke may be used if it is so desired.

In all the tests conducted using the artificial casings in the absence of heat, the finished sausage product took on deep crevices or folds in the casing and meat. In all instances the finished product had an extremely rough appearance and could not be considered a saleable product. But when the encased sausage product was subjected to the heat treatment as hereinbefore described, a high quality finished product resulted.

It has also been discovered that the quality of the finished product may be further enhanced by conducting the heat treatment under certain conditions of humidity. The percentage of humidity in a smokehouse or heating room is ordinarily less than 30%. By increasing the relative humidity of the heat treatment room or smokehouse to from about 30 to 100%, any tendency of the finished product to have wrinkles or folds or crevices is eliminated. I have discovered that the optimum percentage of relative humidity during the heat treatment cycle is from about 80 to about 100%.

After the heat treatment has been completed, the sausage may be showered under hot water for a short period of time to remove any grease which has accumulated on the casing, and then tap water for a short period of time, preferably about four minutes. The sausages are then hung at room temperature for from two to four hours, and at the end of this time, the sausage is placed in the final drying room in sausage hanging sections. The length of time spent in the final drying room will vary with the kind of product desired and the diameter of the sausage, although normally the sausage is retained for a period of from 35 to 120 days at a temperature of about 55° F. and a relative humidity of from 67 to 72%.

I have discovered that by using the artificial casings in conjunction with the heat treatment operation, the drying time can be reduced to approximately 50%, that is, where a sausage product formerly required 120 days to dry, it now requires approximately 50 days to produce a product of comparable quality, color, flavor, and general appearance.

Another of the important effects of this invention is to substantially reduce the amout of spoilage due to molds, discoloration and deterioration. As meats will mold under almost any conditions, except when frozen, mold may appear on sausage to some extent in any drying room. Yet we have discovered that by materially reducing the amount of time the sausage product is retained in the drying room, we have substantially reduced the amount of mold which forms on the sausage products.

It should also be noted that the use of this method of dry sausage production has resulted in a substantial reduction in the cost of producing dry sausage. Casing costs have been lowered to an amount approximately 15% of that formerly spent on natural casings. In addition, the achievement of a substantial reduction in drying time permits a greater volume of sausage to be processed through the more efficient use of drying facilities.

The following is a specific example illustrating the preparation of a salami sausage embodying the present invention:

*Example*

Meat: 100 lbs. of special lean pork trimmings (80% lean).
Spice:
| | | |
|---|---|---|
| Salt | lb | 3⅓ |
| Nitrate soda | oz | 1¼ |
| Sugar | oz | 4 |
| Whole white pepper | oz | 4 |
| Garlic powder | oz | ⅛ |
| Dry spice, No. 144 | oz | 8 |

The meat is chopped through a Roto-Cut machine for 30 seconds or through a grinder machine using a plate having 3/16 inch openings. The ground meat and the spices are then placed in a mixing machine to obtain an equal distribution of the lean meat, spices and curing materials.

Thereafter the meat emulsion is delivered to a curing cooler and in this chill room the meat is spread out in sausage curing trucks in layers about 12 inches thick. The meat emulsion is kneaded to expel as much air as possible and the surface of the meat is covered with parchment to prevent oxidation by the air. The meat is allowed to remain in this chill room for from 24 to 96 hours at a temperature of 36°–38° F.

After removal from the cooler, the meat is stuffed into cream colored Brechteen casings, of size 90 mm. x 22 inches. The stuffed sausage product is then placed in a sausage hanging curing cooler at 36°–38° F. for from three to five days.

The stuffed sausage is then placed in a tempering room at 70° F. and 80–90% relative humidity for one day.

Cages containing the sausage are placed in a heated room or smokehouse. For the first 20 hours the temperature is maintained at 100° F., for the next 2 hours at 110° F., for the next 4 hours at 120° F., and for the final 3 hours at 130° F. During the foregoing heat treating operation, the relative humidity was maintained at about 100%.

After the heat treatment has been completed, the sausage is showered under warm water for 10 minutes and tap water for 12 minutes to remove any grease which may have accumulated on the casing.

Finally, the sausage is placed in a drying room in sausage hanging sections for approximately 50 days at a temperature of 55° F. and 70% relative humidity.

Although the invention has been described in connection with specific embodiments, it will be apparent that many changes and modifications may be made without departing from the spirit of the invention.

I claim:

1. A method of producing a dry, Italian-type sausage comprising, heat treating an artificial casing filled with a partially cured meat emulsion at a temperature of from about 80° F. to about 170° F. for a period of time of from 1 to 40 hours, said artificial casing being composed of animal fibers derived mainly from animal hides with cross-tensilization of fibers to enhance the strength of said casing, and drying said sausage for a period of time in excess of 35 days.

2. The method of claim 1 wherein said heat treating is conducted at a temperature of from about 80° F. to about 140° F. for a period of time of from 4 to 40 hours.

3. The method of claim 1 wherein said heat treating is conducted at a relative humidity of from about 30 to about 100%.

4. A method of producing a dry, Italian-type sausage comprising, filling an artificial casing with a partially cured meat emulsion, said casing being composed of animal skin fibers so arranged with respect to one another as to impart enhanced strength to the casing, cool curing said sausage, drying said sausage and heat treating said encased sausage for a period of from 4 to 40 hours at a temperature of from 80°–140° F., and thereafter drying said sausage for from 35 to 120 days.

5. The method of producing a dry, Italian-type sausage as set forth in claim 4 wherein said heat treating is conducted at a relative humidity of from about 80 to about 100%.

6. A method of producing a dry, Italian-type sausage comprising, filling a flexible artificial casing with a partially cured meat emulsion, said casing being composed of animal fibers derived mainly from animal hides with cross-tensilization of said fibers to enhance the strength of said casing, cool curing said encased sausage, tempering said sausage for about two days at about 70° F. and 85% relative humidity, heat treating said sausage for a period of from 28 to 30 hours at a temperature of from 120°–130° F., and drying said sausage for a period of time of about 50 days.

7. The method of claim 6 wherein said heat treating is conducted at a relative humidity of from about 80 to 100%.

References Cited in the file of this patent

UNITED STATES PATENTS

| | | |
|---|---|---|
| 2,355,548 | Musher | Aug. 8, 1944 |
| 2,792,305 | Harper | May 14, 1957 |
| 2,882,163 | Knaff | Apr. 14, 1959 |
| 2,896,254 | Braun | July 28, 1959 |